(12) United States Patent
Barrenechea Gruber et al.

(10) Patent No.: US 12,393,886 B2
(45) Date of Patent: Aug. 19, 2025

(54) POWER MANAGEMENT OF A HYBRID POWER PLANT

(71) Applicant: Siemens Gamesa Renewable Energy Innovation & Technology S.L., Sarriguren (ES)

(72) Inventors: Roberto Carlos Barrenechea Gruber, Madrid (ES); Patxi Mendizabal Abasolo, Cordovilla (ES); Pedro Maria Zudaire Latienda, Ororbia (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 365 days.

(21) Appl. No.: 17/789,882

(22) PCT Filed: Dec. 8, 2020

(86) PCT No.: PCT/EP2020/085059
§ 371 (c)(1),
(2) Date: Jun. 29, 2022

(87) PCT Pub. No.: WO2021/144073
PCT Pub. Date: Jul. 22, 2021

(65) Prior Publication Data
US 2023/0073358 A1 Mar. 9, 2023

(30) Foreign Application Priority Data
Jan. 13, 2020 (EP) ..................................... 20380001

(51) Int. Cl.
*G06Q 10/04* (2023.01)
*G06Q 50/06* (2012.01)
(Continued)

(52) U.S. Cl.
CPC ............. *G06Q 10/04* (2013.01); *G06Q 50/06* (2013.01); *H02J 3/004* (2020.01); *H02J 3/381* (2013.01);
(Continued)

(58) Field of Classification Search
CPC ...................................................... G06Q 10/04
See application file for complete search history.

(56) References Cited

U.S. PATENT DOCUMENTS

2011/0231028 A1* 9/2011 Ozog ....................... H02J 3/14
700/291
2011/0307109 A1 12/2011 Sri-Jayantha
(Continued)

FOREIGN PATENT DOCUMENTS

CN 102184475 A 9/2011
CN 103827482 A 5/2014
(Continued)

OTHER PUBLICATIONS

PCT International Search Report and Written Opinion of International Searching Authority mailed Feb. 19, 2021 corresponding to PCT International Application No. PCT/EP2020/085059 filed Dec. 8, 2020.
(Continued)

*Primary Examiner* — Suresh Suryawanshi
(74) *Attorney, Agent, or Firm* — Schmeiser, Olsen & Watts, LLP

(57) ABSTRACT

A method of power management of a hybrid power plant includes at least one type of renewable power generation equipment and an energy storage system, including: before a first dispatching time range: using first forecasts of energy production capability and energy price, and in particular hybrid plant status and plant parameters, to derive a first power generation schedule defining power generation in the
(Continued)

Figure 1:
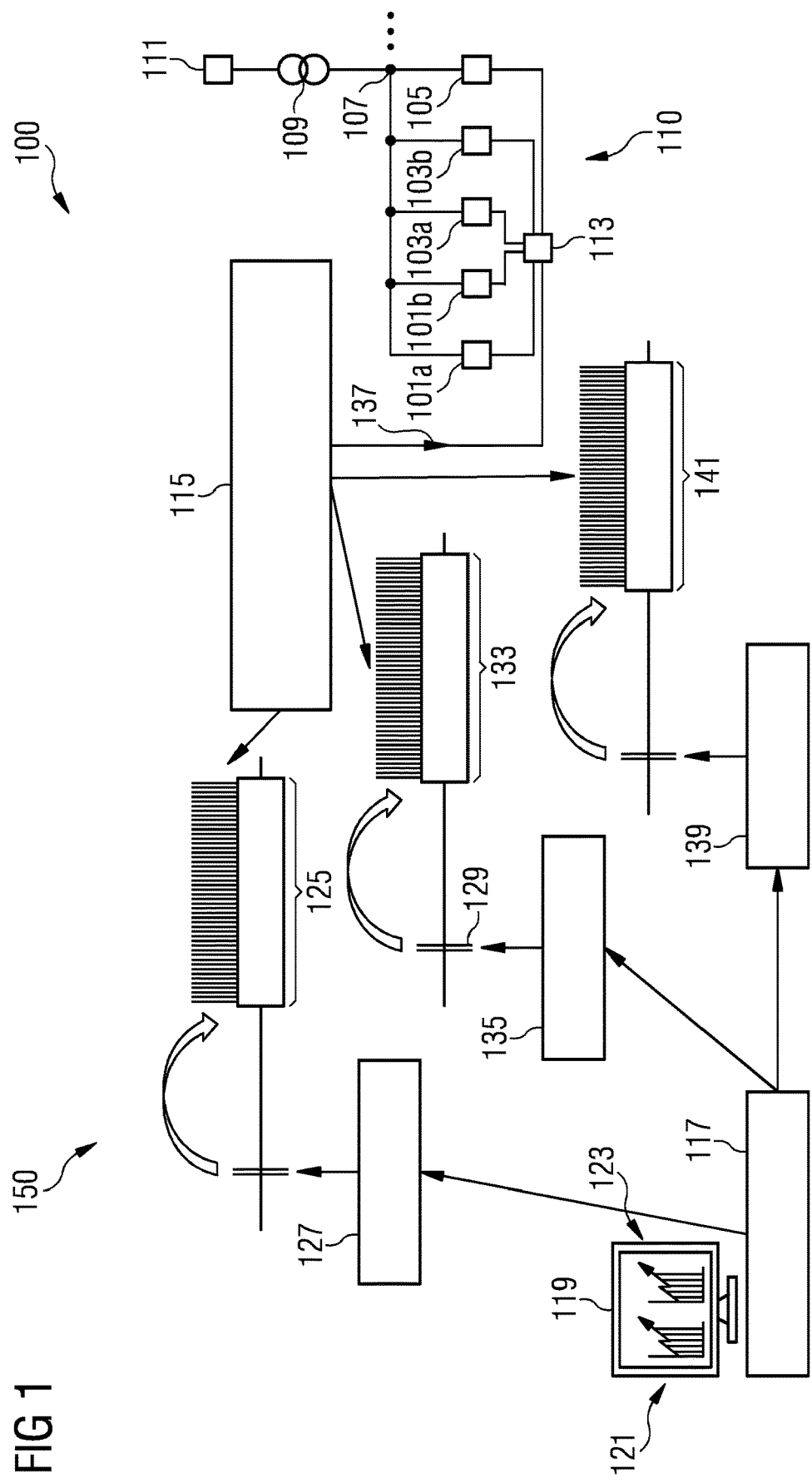

first dispatching time range; at a dispatch point in time within the first dispatching time range: using second forecasts of energy production capability and energy price, and in particular plant status and plant parameters, to derive a second power generation schedule defining power generation in a second dispatching time range; and calculating an optimal power injection value for the dispatch point in time based on the first power generation schedule and the second power generation schedule taking into account at least one constraint.

15 Claims, 3 Drawing Sheets

(51) Int. Cl.
    *H02J 3/00*          (2006.01)
    *H02J 3/38*          (2006.01)

(52) U.S. Cl.
    CPC .......... *H02J 2300/20* (2020.01); *Y02B 70/30* (2013.01); *Y02E 10/00* (2013.01)

(56) References Cited

U.S. PATENT DOCUMENTS

| | | | | |
|---|---|---|---|---|
| 2013/0190938 A1* | 7/2013 | Zadeh | ............... | H02J 13/00006 |
| | | | | 700/291 |
| 2014/0142779 A1* | 5/2014 | Stoettrup | ................. | H02J 3/50 |
| | | | | 700/297 |
| 2014/0316592 A1 | 10/2014 | Haj-Maharsi et al. | | |
| 2015/0278968 A1* | 10/2015 | Steven | ................ | G06Q 50/06 |
| | | | | 705/7.35 |
| 2015/0381089 A1 | 12/2015 | Tarnowski et al. | | |
| 2019/0052088 A1 | 2/2019 | Johansson et al. | | |
| 2021/0336443 A1* | 10/2021 | Møller | ..................... | H02J 3/46 |
| 2022/0255323 A1* | 8/2022 | Mendizabal Abasolo | ................... | |
| | | | | G06Q 10/06315 |

FOREIGN PATENT DOCUMENTS

| | | | | | |
|---|---|---|---|---|---|
| CN | 104969436 | A | | 10/2015 | |
| CN | 107332286 | A | | 11/2017 | |
| CN | 108028543 | A | | 5/2018 | |
| CN | 108039736 | A | | 5/2018 | |
| EP | 2733810 | B1 | * | 4/2018 | ............ G05B 13/02 |
| EP | 3823125 | A1 | * | 5/2021 | ............ G06Q 10/04 |
| KR | 20200100626 | A | * | 8/2020 | |
| WO | 2013106941 | A1 | | 7/2013 | |
| WO | 2017201427 | A1 | | 11/2017 | |

OTHER PUBLICATIONS

Chinmay Kumar Nayak, Manas Ranjan Nayak: "Technoeconomic analysis of a grid-connected PV and battery energy storage system considering time of use pricing"; Turkish Journal of Electrical Engineering & Computer Sciences; Accepted/Published Online: May 9, 2017, Final Version: Jan. 26, 2018; Turk J Elec Eng & Comp Sci (2018) 26: pp. 318-329; doi:10.3906/elk-1703-35.

Mauricio B. C. Salles, Junling Huang, Michael J. Aziz and William W. Hogan: "Potential Arbitrage Revenue of Energy Storage Systems in PJM"; Energies 2017, 10, 1100; doi:10.3390/en10081100; www.mdpi.com/journal/energies; Published: Jul. 27, 2017.

Xian Guoand, Dr. Cameron A. MacKenzie: "Optimal Bidding Strategy for GENCO with Green Power in Day-ahead Electricity Market"; Jan. 5, 2016.

Charles Quann: Thesis "Renewables Firming Using Grid-Scale Battery Storage in a Real-Time Pricing Market"; In partial fulfillment of the requirements, For the degree of Master of Science, Colorado State University, Fort Collins, Colorado, Summer 2017.

* cited by examiner

POWER MANAGEMENT OF A HYBRID POWER PLANT

CROSS-REFERENCE TO RELATED APPLICATIONS

This application claims priority to PCT Application No. PCT/EP2020/085059, having a filing date of Dec. 8, 2020, which claims priority to EP Application No. 20380001.6, having a filing date of Jan. 13, 2020, the entire contents both of which are hereby incorporated by reference.

FIELD OF TECHNOLOGY

The following relates to a method and to an arrangement of power management of a hybrid power plant comprising at least one type of renewable power generation equipment, such as wind turbine and/or solar energy conversion equipment, and an energy storage system. Further, the following relates to a hybrid power plant comprising the arrangement.

BACKGROUND

A renewable power plant comprises at least one type of renewable energy generation equipment. A hybrid power plant comprises additionally a storage system for storing electric energy. It has been observed that the predictability and dispatchability of energy supply of renewable power plants are not in all situations satisfied in a reliable manner. Furthermore, the improvement of predictability and continuity is desired, since it may allow that the renewable energy provides ancillary services and may participate in energy markets.

SUMMARY

An aspect relates to a method and a corresponding arrangement of power management of a hybrid power plant, wherein predictability and/or dispatchability are improved and at the same time complying with grid operator set requirements.

According to an embodiment of the present invention it is provided a method of power management of a hybrid power plant comprising at least one type of renewable power generation equipment and an energy storage system, comprising: before a first dispatching time range: using first forecasts of energy production capability and energy price, and in particular hybrid plant status and plant parameters, to derive a first power generation schedule defining power generation in the first dispatching time range; at a dispatch point in time within the first dispatching time range (and in particular before a second dispatching time range): using second forecasts of energy production capability and energy price, and in particular plant status and plant parameters, to derive a second power generation schedule defining power generation in the second dispatching time range; and calculating an optimal power injection value for the dispatch point in time based on the first power generation schedule and the second power generation schedule taking into account at least one constraint.

The method may be performed by for example an energy management system (EMS) which may be remote from the renewable power generation equipment, such as a wind park or a solar park. In other embodiments, the method may be performed for example by a power plant controller, such as a wind park controller or a solar park controller. The renewable power generation equipment may comprise one or more wind turbines and/or one or more solar energy conversion equipment, such as photovoltaic cell, and/or one tidal energy conversion equipment and/or other types of renewable power generation equipment.

The energy storage system may for example comprise one or more batteries or accumulators which may store electric energy in form of chemical energy and/or mechanical energy. The renewable power generation equipment may comprise or may not comprise a converter for example to convert a DC voltage (for example of a battery or an accumulator or a photovoltaic cell) to an AC voltage having a frequency for example corresponding to a nominal frequency (for example 50 Hz or 60 Hz) of an electrical utility grid. The hybrid power plant may be connected or connectable (for example via one or more breakers) to an electrical utility system providing electric energy to plural consumers. The power management may relate to the management of active power and/or reactive power.

The first forecasts may relate to values derived based on data relating to a time before the first dispatching time range. The forecast of the energy production capability may for example comprise forecasts of energy or power due to wind and/or solar irradiance. The forecasts regarding energy price may relate to forecasts of prices for different types of energy and/or in different timespans. The first power generation schedule may relate to a schedule of active power and/or reactive power to be generated in the first dispatching time range. Dispatching power according to exactly the first power generation schedule may not be possible, since the power at the actual dispatch point in time within the first dispatching time range may not be available due to changing weather conditions, for example changing wind conditions and/or solar irradiance conditions. Therefore, second forecast, in particular more recent forecast of the energy production capability and energy price are considered to derive a second power generation schedule (also relating to active power and/or reactive power to be generated in the second dispatching time range).

The first dispatching time range and the second dispatching time range may or may not partly overlap such that at least for one point in time, in particular the dispatch point in time within the first dispatching time range, a schedule value of the power is available from the first power generation schedule as well as from the second power generation schedule. The two power values may deviate meaning that for example the power as comprised in the first power generation schedule is different from the power as comprised in the second power generation schedule. In this case (and potentially other cases as well), the method proposes to calculate the optimal power injection value for the considered dispatch point in time based on the first power generation schedule and also the second power generation schedule taking into account at least one constraint (for example regarding a deviation from the previously derived first power generation schedule).

For example, the first power generation schedule may have been communicated to the grid operator and the grid operator may rely that the hybrid power plant in fact will inject its power according to the first power generation schedule. If then, according to the more recent forecast it turns out that the power as scheduled by the first power generation schedule is not the same anymore, it may be desired to mitigate or minimize the deviations of the actually injected power from the power as listed in the first power generation schedule. By calculating the optimal power injection value (and in particular also injecting power according to the optimal power injection value), the predictability of power injection from the hybrid power plant is improved thereby also contributing to stabilizing the utility grid.

The method may continuously be performed repeating successively deriving further power generation schedules at later points in time and repeatedly calculating optimal power injection values for later points in time.

According to an embodiment of the present invention, the constraint comprises a power threshold, wherein the optimal power injection value is calculated such that a deviation between the optimal power injection value and a power value according to the first generation schedule is below the power threshold, wherein the power threshold is a relative power threshold, in particular defined by the grid operator, defining a maximally allowable deviation.

When the optimal power injection value is calculated such that the deviation between the optimal power injection value and a power value according to the first generation schedule to be below the power threshold, the predictability of the power injection by the hybrid power plant is improved and oscillations in the utility grid may be mitigated. For example, the power threshold may be a relative power threshold, such as between e.g., +10% and −10% of the power as comprised in the first power generation schedule. Thus, it may be ensured that the actually injected power by the hybrid power plant only slightly deviates from the power as dictated by the first power generation schedule. Thereby, the grid operator in an improved manner may rely on the (optionally previously communicated) power generation schedule.

According to an embodiment of the present invention, calculating the optimal power injection value comprises finding an extreme, in particular minimum, of an objective function subject to the constraints.

The objective function may in a mathematical manner define a control goal, for example improvement or optimization of energy output, improvement or minimization of load and/or improvement or optimization of compliance with external references, such as power references (for example regarding active and/or reactive power) as defined for example by a grid operator. Thereby, mathematical optimization methods may be applied. For example, linear or non-linear optimizations may be applied.

According to an embodiment of the present invention, the objective function and/or the at least one constraint is designed to achieve at least one of: a deviation mitigation, thereby in particular applying capacity firming; a technical optimization, thereby in particular applying capacity firming; an economic optimization, thereby in particular applying energy arbitrage and/or time shifting, wherein price differences at different time ranges and/or for different types of energy are exploited for profit maximization.

The calculating an optimal power injection value may be performed using a model including the objective function and one or more constraints.

The model may comprise several constraints which may be modelled by corresponding mathematical functions defined by, for example, operational variables of the hybrid power plant and/or forecast values and/or power limits and/or plant status and/or grid power limits and/or storage limits/capacity/loading state etc. The objective function may be represented/established as a mathematical function depending on the operational variables and parameters of the hybrid power plant and the forecast of energy production capability and energy price. The objective function as well as the one or more constraints may be selected or defined according to the particular application and control objective or control goal. Thereby, great flexibility is provided for effectively managing the hybrid power plant.

According to an embodiment of the present invention, the model (e.g., defined by an objection function and a set of constraints) is composed of continuous variables with a linear characteristic; the model's objective function and the set of linear constraints define a convex solution space including the optimal power injection value, wherein the optimal power injection value is in particular an extreme of the convex solution space.

The continuous variables may be different from integer variables but may be defined in the space of real numbers. Linear constraints may comprise a constraint which is linear in the one or more operational variables of the power plant or which is linear in a function depending on the one or more operational parameters of the hybrid power plant and other parameters/variables as listed above. The set of linear constraints may define a polyhedron in a high dimensional space, wherein the dimension of the high dimensional vector space may be equal to the number of different (operational) variables. The optimal solution of the optimization problem may be at an edge or a corner of the convex solution space. Solving the optimization problem based on linear constraints and finally a convex solution space may be simpler than solving a non-linear optimization problem.

According to an embodiment of the present invention, calculating the optimal power injection value comprises applying the SIMPLEX method. The SIMPLEX method is an algorithm for linear programming. The shape of the polytope (the convex solution space) is defined by the constraints applied to the objective function. The SIMPLEX method may maximize or minimize an expression linear for example in the variables of the objective function, including e.g., the operational variables of the hybrid power plant. Furthermore, all constraints may be linear in the variables (e.g., operational parameters). The feasible region in which the solution lies satisfies all constraints and may be a convex polytope, i.e., the convex solution space. The convex polytope may have a finite number of corners. The optimal solution may also be assumed at an edge of the polyhedron. The SIMPLEX method may evaluate the objective function along edges of the polytope to find the optimum. Also, the number of vertices or edges of the polytope is finite, thus, the SIMPLEX algorithm always terminates.

According to an embodiment of the present invention, the constraint comprises at least one of the following: at least one hybrid plant requirement; at least one hybrid plant maximum power injection capability; a charging and/or discharging capability of the storage system; an allowed charging and/or discharging level of the storage system. In other embodiments, other constraints may be considered as well. Thereby, great flexibility is provided for design methods according to the particular needs.

According to an embodiment of the present invention, the first power generation schedule and the second power generation schedule overlap in time or do not overlap in time. When the first and the second power generation schedules overlap in time, then there is at least one point in time for which respective power values are dictated by both, the first and the second power generation schedule. Further, the deviation between these two power values may be evaluated and the respective optimal power injection value may be calculated based on these two different power values and further possibly or optionally depending on other values, such as actual energy production capability and/or energy price etc.

In other embodiments, the end point of the first dispatching time range may be equal to the starting point of the second dispatching time range. Thus, at least the power value at the end of the first dispatching time range and corresponding to the start of the second dispatching time range may be compared and a respective optimal power injection value may be calculated for this point in time.

According to an embodiment of the present invention, the optimal power injection value is calculated further considering actual energy production capability and/or actual energy price and/or actual hybrid plant status. Thus, not only forecast energy production capability and/or energy price may be considered but also the actually available power or energy (for example due to wind and/or due to solar irradiance) and the actual market prices of the energy. Thereby, the control may further be improved.

According to an embodiment of the present invention, wherein the first and/or second dispatching time range has a duration of between 1 hours and 48 hours; and/or wherein the optimal power injection value for subsequent dispatch points in time is calculated every 5 min to 60 min repetitively. Other time ranges are possible. For example, the dispatching time ranges may essentially be 1 day. Thereby, the grid operator may in an improved manner plan operation of energy injection into the utility grid.

According to an embodiment of the present invention, the forecasts of energy production capability and/or energy price are obtained from an external source and/or include forecasts regarding at least one of: power due to wind; power due to sun irradiance; power due to tidal; plant power; energy price of wind energy; energy price of solar energy; energy price of tidal energy; general energy price (energy price of any source).

In other embodiments, the forecasts are (e.g., partly) internally calculated, for example based on measured wind speed and/or measured sun irradiance and further including weather forecast data taken from other sources or internally derived.

According to an embodiment of the present invention, the first and/or second power generation schedule relates to hybrid plant power output at a point of common connection to which all power generation equipment and the energy storage system is connected or to another point or node to which at least one power generation equipment and/or at least the energy storage system is connected.

The point of common connection may be connected or connectable via one or more plant transformers to the utility grid. Between the respective power plant and the utility grid for example a high power/voltage AC transmission line or high power/voltage DC transmission line may be arranged. The wind park may relate to a wind park installed offshore or installed onshore. The same may hold for the solar path.

According to an embodiment of the present invention, the first and/or the second power generation schedule is derived such as to maximize plant power output and/or to minimize usage of the energy stored in the storage system and/or to maximize profit of selling the generated energy; and/or wherein the hybrid plant comprises at least one wind turbine, in particular a wind park, and/or at least one solar energy converting unit, in particular solar park, and/or a tidal energy converting equipment. Thereby, high flexibility is provided.

It should be understood that features, individually or in any combination, disclosed, described, explained or provided for a method of power management of a hybrid power plant are also applicable, individually or in any combination, to an arrangement for power management of a hybrid power plant according to embodiments of the present invention and vice versa.

According to an embodiment of the present invention it is provided an arrangement for power management of a hybrid power plant comprising at least one type of renewable power generation equipment and an energy storage system, the arrangement comprising a processor adapted: before a first dispatching time range: to derive, using first forecasts of energy production capability and energy price, and in particular hybrid plant status and plant parameters, a first power generation schedule defining power generation in the first dispatching time range; at a dispatch point in time: to derive, using second forecasts of energy production capability and energy price, and in particular plant status and plant parameters, a second power generation schedule defining power generation in the second dispatching time range; and to calculate an optimal power injection value for the dispatch point in time based on the first power generation schedule and the second power generation schedule taking into account at least one constraint.

Furthermore, a hybrid power plant system is provided, comprising at least one type of renewable power generation equipment, such as at least one wind turbine and/or at least one solar conversion equipment, an energy storage system and an arrangement according to the preceding embodiments.

The at least one type of renewable power generation equipment and the energy storage system form a hybrid power plant.

BRIEF DESCRIPTION

Figure 2:
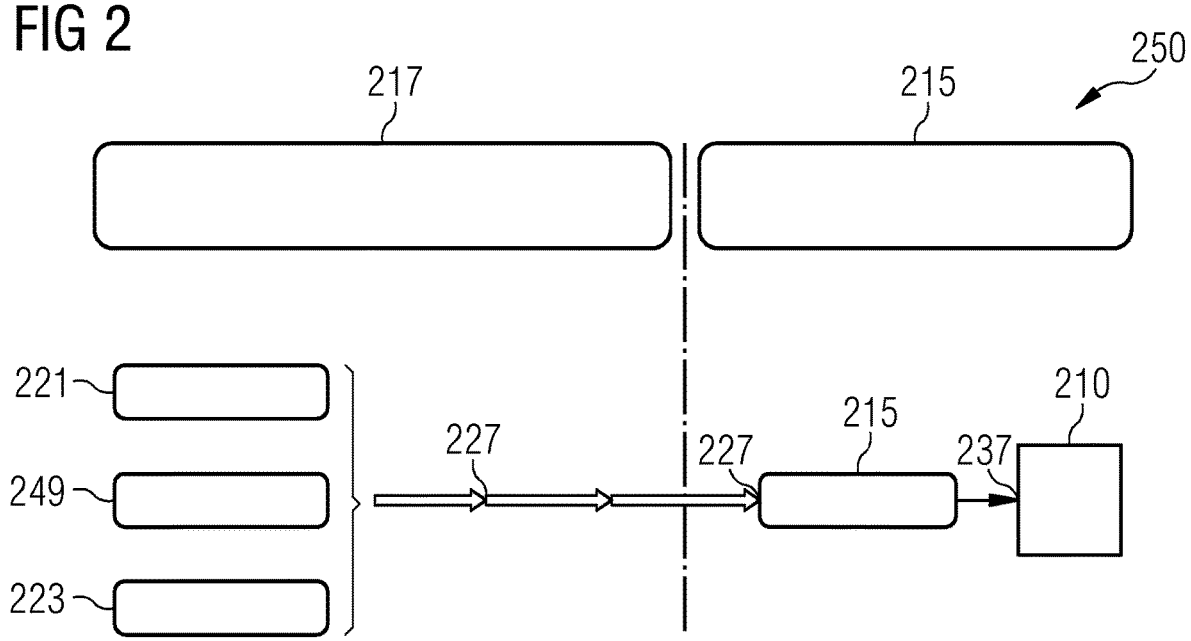
Figure 3:
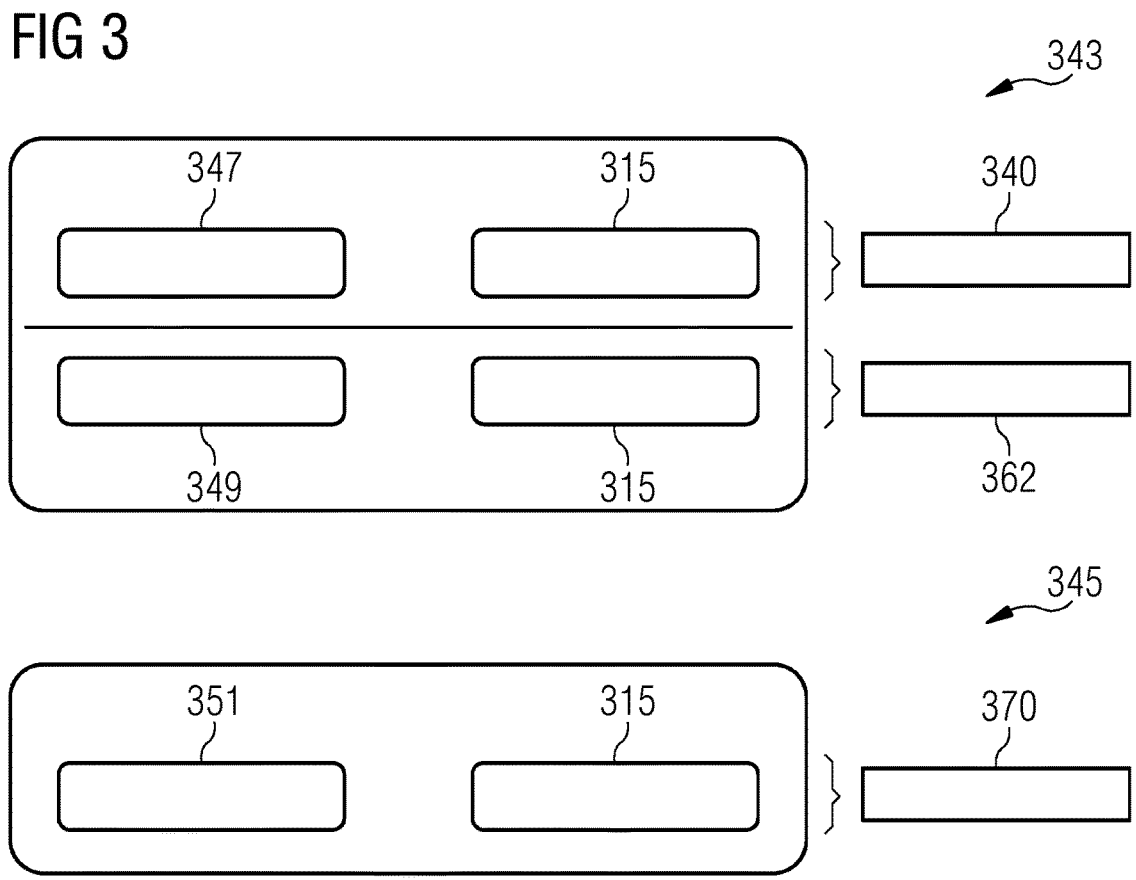
Figure 4:
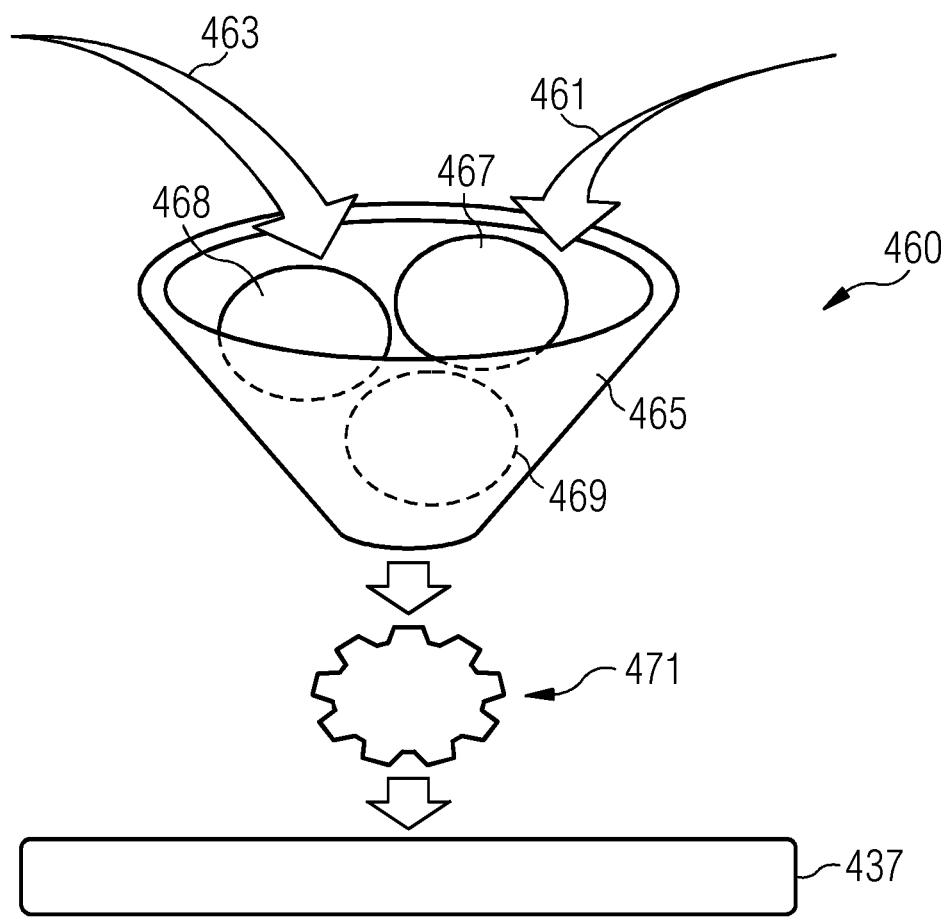

Some of the embodiments will be described in detail, with reference to the following figures, wherein like designations denote like members, wherein:

FIG. 1 schematically illustrates a hybrid power plant system including an arrangement for power management of a hybrid power plant according to an embodiment of the present invention, performing a method of power management according to an embodiment of the present invention;

FIG. 2 schematically illustrates an arrangement for managing a hybrid power plant according to an embodiment of the present invention;

FIG. 3 schematically illustrates aspects of management methods and arrangements according to embodiments of the present invention; and FIG. 4 schematically illustrates an optimization algorithm/function applied according to embodiments of the present invention.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The hybrid power plant system 100 schematically illustrated in FIG. 1 comprises a hybrid power plant 110. The hybrid power plant 110 comprises at least one type of renewable power generation equipment 101a, 101b and comprises another type of renewable power generation equipment 103a, 103b. Furthermore, the hybrid power plant 110 comprises a storage system 105. The renewable power generation equipment 101a, 101b, 103a, 103b, 105 as well as the energy storage system 105 are all connected (for example via not illustrated breakers) to a point of common connection 107. Via a park transformer 109, the power is delivered to a utility system 111.

Besides the hybrid power plant 110, the hybrid power plant system 100 comprises an arrangement 150 for power management according to an embodiment of the present invention. The power generation equipment 101, 103 and also the energy storage system 105 are controlled by a respective plant controller 113 and/or directly by a power delivery engine 115 which is part of the arrangement 150 for power management according to an embodiment of the present invention which is also denoted as energy management system. The arrangement 150 comprises at least one processor which is adapted to carry out or control a method of power management of the hybrid power plant 110.

In the embodiment illustrated in FIG. 1, the arrangement 150 (energy management system EMS) is implemented in two stages or two blocks, namely a bid forecast calculation block or module 117 and the power delivery engine 115. The Bid forecast calculation block 117 is communicatively coupled to a forecast service 119 or an internal forecast module 119. From the module 119, the bid forecast calculation module 117 receives forecasts regarding energy production capability 121 and regarding energy price 123.

In particular, the Bid forecast calculation block 117 uses (e.g. before a first dispatching time range 125) first forecasts of energy production capability and energy price to derive a first power generation schedule 127 defining power generation in the first dispatching time range 125. Further, at a dispatch point in time 129 which is within the first dispatching time range 125, the Bid forecast calculation module 117 uses a second forecast of energy production capability and energy price to derive a second power generation schedule 135 defining power generation in the second dispatching time range 133. Based on the first power generation schedule 127 and the second power generation schedule 135, the power delivery engine 115 calculates an optimal power injection schedule 137 for the first dispatch time range 125.

The first schedule may e.g., be calculated by the Bid Forecast calculation algorithm, the second schedule may be calculated by the Engine, for the same time range. The Bid Foreacast may calculate a schedule that is later established as the "reference" for the Engine algorithm. The engine algorithm may take this schedule as an input and calculate the optimal power injection in order to dispatch the aforementioned schedule within tolerable bounds. This process example is repeated three times in the FIG. 1 and may be further continued repeatedly for later points in time.

Later on, the process is continued by deriving a third power generation schedule 139 using third forecasts of energy production and capability, wherein the third power production schedule 139 relates to a third dispatching time range 141. In particular, the power delivery engine 115 may calculate the optimal power injection schedule 137 i.e., e.g. every 15 minutes for a respective 15 minute interval, 96 times a day.

The incorporation of storage devices (for example 105 in FIG. 1) into renewable generation power plants together with an adequate power generation and energy price forecast has made it possible to develop predictive optimization algorithms oriented towards improving the energy management of the hybrid power plant.

FIG. 2 schematically illustrates the arrangement for power management 250 in a schematic manner. The arrangement 250, also called energy management system, comprises two main sub-systems that allow the hybrid plant to be more predictable and dispatchable. The EMS may consider a hybrid plant as a unique and controllable power source.

The energy management system EMS is based on the two stages, namely the Bid forecast calculation module 217 and the power delivery engine 215. The Bid forecast calculation module 217 calculates the future power generation schedule 227. The power delivery engine 215 optimizes the current available generation and the storage system capability or capacity at the moment of dispatch in order to guarantee the injection of the power into the grid as established by the power schedule 227 as determined by the Bid forecast calculation module 217, while avoiding power deviations that may be subject to penalizations.

In particular, the Bid forecast calculation module 217 utilizes a natural forecast 221 (optionally iforecast data 249) as well as financial forecast 223 for calculating the power schedule 227. The power delivery engine 215 receives the bid reference (also referred to power schedule) 227 and finally calculates for each dispatch point in time an optimal power injection value 237 which is delivered to the hybrid power plant 210.

The Bid forecast calculation may execute asynchronously or synchronously and the timescale is before the actual dispatching period. The power delivery engine 215 may execute synchronously and continuously and the timescale may be during the dispatching period. In this way, it may be possible for renewable energy plants which are provided with storage capability to present the characteristics of a traditional or "dispatchable" power plant, where it is possible to choose the optimal future power injection and being able to actually deliver it when the moment arrives.

The target power schedule (e.g., 210 in FIG. 2) sent to the power plant may consider the production output at the point of interconnection (for example 107 in FIG. 1) or to the BESS (battery energy storage system) point of connection only or may also consider power or electrical characteristics at other points or nodes. Thereby, the energy management system does not control the storage system, wind turbine generators or photovoltaic inverters individually. Instead, a local plant controller (for example controller 113 in FIG. 1) and/or the power delivery engine 115 may have the power tracking possibility and it may be responsible for meeting the power reference by means of controlling the production of the individual generators and storage elements forming the power plant. The EMS will take all this into consideration and will send total power references only.

FIG. 3 schematically illustrates which services may be performed or offered by the arrangement or the energy management system according to embodiments of the present invention. As a first service, capacity firming 343 is provided and as a second service, energy arbitrage/time-shifting 345 is provided. Based on a natural forecast 347 and using the power delivery engine 315, a deviation to previously scheduled power is mitigated providing deviation mitigation 340. Based on other forecast data 349 (iforecast) and using the power delivery engine 315, a technical optimization 362 is achieved.

During energy arbitrage 345, a financial forecast algorithm 351 is used to economically optimize the power schedule, and the power delivery engine 315 calculates its optimal dispatch power schedule 370.

In the following, exemplary embodiments of the two main modules, i.e., the Bid forecast calculation module and the power delivery engine are described. Embodiments of the present invention are not restricted to the following details.

Bid Forecast Calculation:

In the "Bid Forecast Calculation" stage of the EMS, the future power injection schedule is calculated and defined based on a predictive optimization algorithm. The optimization algorithm will take the electrical power production and market price forecasts for a certain time period in the future as an input, as well as the plants state and parameters, and it will calculate the optimal power injection for that period of time (optimal power injection schedule).

This feature will allow the plant's participation in different energy markets (such as the day-ahead, intraday and continuous markets) where firm (e.g., constant with some margin) power value offers are mandatory.

The optimization algorithm within the "Bid Forecast Calculation" is able to calculate the most adequate power generation and storage management strategy in order to achieve a specific power injection objective (market-based power time shifting and power injection optimization).

The search of the optimal solution is bound to the feasible space defined by the necessary technical requirements included in the mathematical model formulation (constraints), such as the plant's maximum power injection capability, the battery's discharging and charging power and capacity, and its allowable charging levels.

The optimization algorithm will calculate the optimal future power injection schedule based on the received forecasts and the estimated plant and battery's state for the considered planning time.

The optimization algorithm was developed formulating the algorithm using continuous variables only instead of using a mixed-integer modelling. This allows to define a linear continuous model whose solution can be calculated using the SIMPLEX method (or its variation) without requiring specialized branch and bound and/or heuristic solution methods.

Power Delivery Engine:

In the "Power Delivery Engine" stage of the EMS, the optimal power values are calculated in order to allow the injection into the grid of the previously calculated optimal power injection schedule within the tolerable bounds.

The optimization algorithm within the "Power Delivery Engine" will take the most recent power generation forecast as an input, as well as the plants state and parameters, and it will calculate the optimal power injection values considering that they must be maintained close to the previously calculated and defined schedule, avoiding deviations above the allowable percentage, thus avoiding penalizations.

The search of the optimal solution is bound to the feasible space defined by the necessary technical requirements included in the mathematical model formulation (constraints), such as the allowable deviations percentage, the plant's maximum power injection capability, the battery's discharging and charging power and capacity, and its allowable charging levels.

The main idea of the Power Delivery Engine, is a power reference tracking and deviations minimization algorithm (to avoid unnecessary battery operation) and the inclusion of a bound relaxation variable so the algorithm can converge to a solution even in scenarios of unexpectedly low energy availability at the moment of dispatch.

The EMS may perform an optimization algorithm.

FIG. 4 schematically illustrates in a schematic manner an optimization algorithm which may be performed by the Bid forecast calculation module and/or by the power delivery engine comprised in the arrangement for power management also denoted as EMS. As inputs, the optimization algorithm 460 receives for example the power limits of the hybrid plant, the power and capacity of the storage element or battery, the hybrid plant status and parameter, the power limits of the grid, the power generation forecasts and the grid energy forecasts as labelled with reference signs 461, 463. In an inside hardware and/or software module 465, an objective function 467 and plant's power and energy constraints 468 as well as grid's power constraints 469 may be definable or defined or considered. A solver 471 may solve to find an extreme of the objective function 467 subject to the constraints 468, 469 based on all (operational) input parameters 461, 463. The output may be the optimal power injection value (or schedule) 437 which may continuously be derived for subsequent dispatch points in time.

A particular embodiment of the optimization algorithm is described below. Embodiments of the invention is not restricted to the optimization algorithm described below.

Optimization Algorithms:

The EMS is based on the modelling and resolution of mathematical optimization models. The model is formulated through one or more objective functions to optimize considering the feasible solution space defined by a set of constraints. These constraints are defined according to the necessary plant and grid's power and energy requirements.

The optimization model is mathematically defined as follows:

$$\text{Min}\{f_1(x), f_2(x), \ldots, f_m(x)\}$$

$$C_k(x) \leq 0$$

$$D_k(x) = 0$$

$$x \in \Omega$$

Where, $f_{(x)}$ = Objective function
$\Omega$ = Solution space
$C_k$ = Inequality constraints
$D_k$ = Equality constraints
x = Modeled variables The optimization model is defined by an objective function and a set of constraints composed of continuous variables with a linear characteristic.

Embodiments of the present invention may also allow to participate in an electricity market as will be described below:

The EMS can e.g. publish a Production forecast for a specific time interval (this is done by the 'Bid Forecast Calculation' Subsystem).

If that forecast is confirmed (this could be done manually or automatically by an external system), The power delivery Engine will take the newest forecast and it will calculate an optimum production schedule considering the objective function and its constraints, that will be send to the local plant controller.

The time span, intervals and update frequency can be adapted in order to adapt the system to different electricity markets or external control systems.

As an advantage of embodiments of the present invention, an optimum production calendar for a certain timespan can be predicted and the local plant control may adjust the production to meet the reference.

In order to overcome the lack of predictability and dispatchability of the renewable energy, virtual power plants (VPP) are being considered as a possible solution. The control of multiple generation resources may allow to compensate the generation errors between them. However, virtual power plants may be a solution at a distribution and transmission system level but are not being considered at power plant point of common connection level unlike the proposed energy management system.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of power management of a hybrid power plant using a processor and having at least one type of renewable power generation equipment and an energy storage system for storing power for a utility grid, comprising:
   before a first dispatching time range: to derive, using first forecasts of energy production capability and energy price, a first power generation schedule defining power generation in the first dispatching time range;
   at a dispatch point in time within the first dispatching time range: using second forecasts of energy production capability and energy price, comprising plant status and/or plant parameters, to derive a second power generation schedule defining power generation in a second dispatching time range;
   calculating an optimal power injection value for the dispatch point in time based on the first power generation schedule and the second power generation schedule taking into account at least one constraint, wherein the first power generation schedule and the second power generation schedule determines an amount of hybrid plant power output communicated to a point of common connection to which the at least one power generation equipment and the energy storage system is connected; and
   injecting the hybrid plant power output produced by the at least one type of renewable power generation equipment and stored by the energy storage system into the utility grid at the point of common connection according to the optimal power injection value.

2. The method according to claim 1, wherein the constraint comprises a power threshold, wherein the optimal power injection value is calculated such that a deviation between the optimal power injection value and a power value according to the first generation schedule is below the power threshold,
   wherein the power threshold is a relative power threshold, defining a maximally allowable deviation.

3. The method according to claim 1, wherein calculating the optimal power injection value comprises finding an extreme of an objective function subject to the constraint.

4. The method according to claim 3, wherein the objective function and/or the at least one constraint is designed to achieve at least one of:
   a deviation mitigation, thereby applying capacity firming;
   a technical optimization, thereby applying capacity firming;
   an economic optimization, thereby applying energy arbitrage and/or time shifting, wherein price differences at different time ranges and/or for different types of energy are exploited for profit maximization.

5. The method according to claim 3,
   calculating the optimal power injection value is performed using a model including the objective function, wherein the model is composed of continuous variables with a linear characteristic;
   wherein the objective function of the model and a set of linear constraints define a convex solution space including the optimal power injection value,
   wherein the optimal power injection value is an extreme of the convex solution space.

6. The method according to claim 1, wherein the constraint comprises at least one of the following:
   at least one hybrid plant requirement;
   at least one hybrid plant maximum power injection capability;
   a charging and/or discharging capability of the storage system;
   an allowed charging and/or discharging level of the storage system.

7. The method according to claim 1, wherein the first power generation schedule and the second power generation schedule overlap in time or do not overlap in time.

8. The method according to claim 1, wherein the optimal power injection value is calculated further considering actual energy production capability and/or actual energy price and/or actual hybrid plant status.

9. The method according to claim 1,
   wherein the first and/or second dispatching time range has a duration of between 1 hours and 48 hours; and/or
   wherein the optimal power injection value for subsequent dispatch points in time is calculated every 5 min to 60 min repetitively.

10. The method according to claim 1, wherein the forecasts of energy production capability and/or energy price are obtained from an external source and/or include forecasts regarding at least one of:
    power due to wind;
    power due to sun irradiance;
    power due to tidal;
    plant power;
    energy price of wind energy;
    energy price of solar energy;
    energy price of tidal energy;
    energy price of any type of energy;
    any other energy generation or consumption.

11. The method according to claim 1,
    wherein the first and/or the second power generation schedule is derived such as to maximize plant power output and/or to minimize usage of the energy stored in the storage system and/or to maximize profit of selling the generated energy; and/or
    wherein the hybrid plant comprises at least one wind and/or at least one solar energy converting unit.

12. An arrangement for power management of a hybrid power plant comprising at least one type of renewable power generation equipment and an energy storage system, the arrangement comprising a processor adapted:
    before a first dispatching time range: to derive, using first forecasts of energy production capability and energy price, a first power generation schedule defining power generation in the first dispatching time range;
    at a dispatch point in time within the first dispatching time range: to derive, using second forecasts of energy production capability and energy price, comprising plant status and/or plant parameters, a second power generation schedule defining power generation in a second dispatching time range; and
    to calculate an optimal power injection value for the dispatch point in time based on the first power generation schedule and the second power generation schedule taking into account at least one constraint,
wherein the arrangement is adapted to carry out or control the method according to claim 1.

13. A hybrid power plant system, comprising:
at least one type of renewable power generation equipment;
an energy storage system; and
the arrangement according to claim 12.

14. The method according to claim 1, wherein the at least one hybrid power plant comprises a wind park.

15. The method of claim 11, wherein the at least one solar energy converting unit comprises a solar park and/or tidal energy converting equipment.

* * * * *